July 7, 1953
G. F. GARDNER
2,644,738
RECORDING DEVICE
Filed March 22, 1951
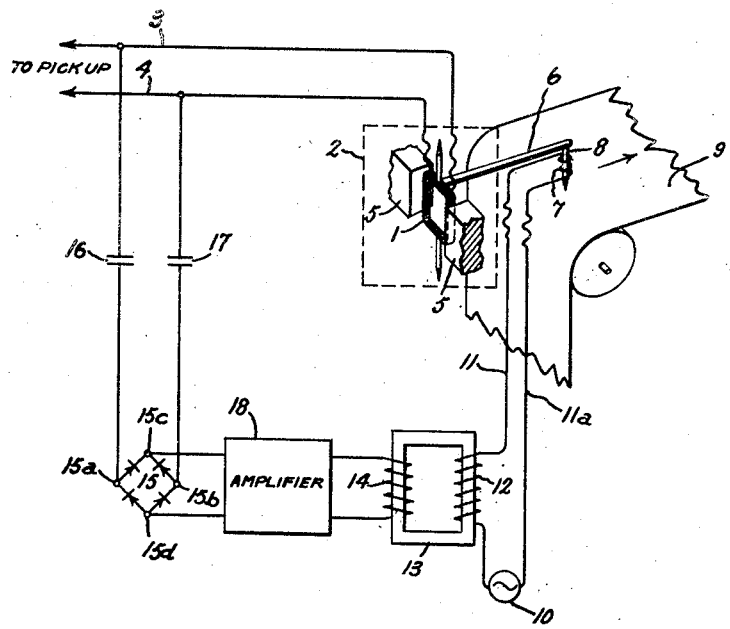
Inventor:
George F. Gardner,
by Paul A. Frank
His Attorney.

Patented July 7, 1953

2,644,738

UNITED STATES PATENT OFFICE 2,644,738

RECORDING DEVICE

George F. Gardner, Scotia, N. Y., assignor to General Electric Company, a corporation of New York Application March 22, 1951, Serial No. 217,007

4 Claims. (Cl. 346—76)

My invention relates to recording devices and more particularly to recording devices in which the recording is made on energy sensitive recording material by an energized marking member.

In such devices the problem of supplying the proper amount of energy to the marking member often presents serious trouble. For example, in recording instruments which use heat sensitive papers and a heated marking member or stylus for recording variations in a predetermined quantity, considerable difficulty is encountered in obtaining the correct heat in the stylus for the speed at which the stylus is moving at any given moment. In conventional recorders, the stylus temperature necessary to produce a legible record when the stylus is at rest is insufficient to produce a clear line when it is moving rapidly. Conversely, if sufficient heat is applied to make a good record when the stylus is moving, the record obtained when the stylus is stationary is badly blurred and most unsatisfactory. A similar problem is often encountered in recording devices which use an electrically sensitive recorder material that is marked by the passage of an electric current therethrough. In certain of these devices, the electrical signal which does the marking is applied across the recording material between a stationary printing bar or plate and a pen stylus. Unfortunately, however, a signal which is strong enough to pierce the paper and make a clear mark at low speeds of the stylus is insufficient to make a legible mark at higher speeds of the stylus.

Therefore, a primary object of my invention is to provide new and improved means for varying the energy input to a recording stylus in response to variations in the quantity being measured.

Another object of my invention is to provide new and improved means for varying the temperature of a heated recording stylus in response to variations in the quantity being recorded.

In accomplishment of the foregoing objectives, I provide an energy control system in which the energy input to the marking member or stylus is controlled by the output of a circuit which includes in serial relationship a rectifier and an amplifier. To make the output of the circuit responsive to the variation of the quantity being recorded, the rectifier is energized by the same signals which initiate movement of the marking member. The exact manner in which the output of the amplifier is employed depends upon the type recorder in which the system is to be used.

For a better and more complete understanding of my invention, together with additional objects and advantages thereof, reference should now be had to the following description and the accompanying drawing, which is a schematic diagram of a preferred embodiment of my invention.

Referring to the drawing, the signal to be recorded, for example, a fluctuating current, is applied to the moving coil 1 of an indicating device 2 through a pair of supply conductors 3 and 4. In device 2, coil 1 is pivotally mounted in cooperative relationship with the field poles of a permanent magnet 5 so that variations of the current in coil 1 result in motor action between the coil and magnet 5. A recording arm 6 is positioned on coil 1 and as coil 1 moves, the recording arm is angularly displaced a corresponding amount. Moving with recording arm 6 is a stylus loop 7 consisting of a heating coil of conducting material, such as Nichrome. More specifically, the stylus loop is disposed to heat a marking member or stylus 8, which is mounted on recording arm 6. Heated stylus 8 contacts a moving sheet of heat sensitive recorder material 9 to provide a permanent record of the current fluctuations, as indicated by coil 1.

The current for heating stylus 8 is supplied to loop 7 from an essentially constant voltage alternating current source 10 through a pair of supply conductors 11 and 11a. Also included in this power supply circuit, in serial relationship to loop 8 and source 10, is a winding 12 of a saturable reactor 13. It is through regulation of the reactance of winding 12 that control of the heating current in loop 7 is accomplished. A second coil 14, mounted on the magnetic core of the reactor, provides the necessary regulating means.

In accordance with my invention, coil 14 is energized with a direct current signal which is proportional to the signal in conductors 3 and 4. A rectifying circuit, such as the bridge type rectifier 15, is employed to change the alternating current signal from supply conductors 3 and 4 to a pulsating direct current signal. Thus, the input terminals 15a and 15b of rectifier 15 are connected respectively to conductors 3 and 4 through the direct current blocking condensers 16 and 17, and the output terminals 15c and 15d of the rectifier are connected to a conventional direct current amplifier 18. The output of amplifier 18 is applied to coil 14 of the reactor.

In the no-signal condition, when stylus 8 is stationary, the reactance of winding 12 is such that the current flow in loop 7 heats stylus 8 sufficiently that it produces a distinct substantially straight line on the heat sensitive record sheet 9 as the record sheet moves at a constant rate under the stylus. However, the heat produced by this current is insufficient for stylus 8 to make a distinct line when the stylus itself is moving.

In order to obtain the correct current upon movement of the stylus, by my invention any signal applied to coil 1 to cause movement or deflection of stylus 8 is also applied to amplifier 18 through rectifier 15. This, then, results in a substantial current flow in winding 14, since that winding is connected to be supplied from amplifier 18. The current in winding 14 increases the magnetic flux in the reactor core and thereby reduces the reactance of winding 12. The reduction in the reactance of winding 12, of course, results in an increased current in loop 7. This raises the temperature of stylus 8 and enables it to produce a distinct line on record sheet 10 in spite of the increased speed of the stylus during deflection. Thus by controlling the heating of the stylus through the same signal which actuates the stylus, a distinct line is obtained on the recording sheet no matter what is the speed of movement of the stylus.

When the actuating signal decays to the original no-signal condition, stylus 8 comes to rest and the current in winding 14 returns to its original small or zero value. This increases the reactance of winding 12 and causes the current in loop 7 to decrease to the aforementioned desired value for the no-signal position of the stylus.

The energy control system of this invention is, however, not restricted to recording devices using a heat sensitive paper and a heated stylus. It may be employed with various other types of recorders. For example, in recording devices using an electrically sensitive recorder sheet which is marked by the passage of an electric current therethrough, the output of the amplifier would be applied directly across the recorder sheet between the pen stylus and a stationary printing bar or plate. This eliminates the need for the reactor and its associated circuit in such a recorder, and still provides an energy supply, i. e., marking current, proportional to the speed of movement of the pen stylus.

While the present invention has been described by reference to a particular embodiment thereof, it will be understood that this is by way of illustration of the principles involved, and that those skilled in the art may make many modifications in the arrangement and mode of operation. Therefore, I contemplate by the appended claims to cover any such modifications as fall within the true spirit and scope of my invention.

What I claim as new and desire to secure by Letters Patent of the United States is:

1. In an inkless recorder having a recording range for recording variations in an electrical quantity on a record sheet having an energy sensitive recording surface, a marking member disposed adjacent said recording surface and movable in response to variations of said electrical quantity, means connected to the source of electrical quantity to be recorded for deriving a control signal that varies throughout said recording range in accordance with said variations of said electrical quantity, and electrical connections for supplying energy to said recording surface through said marking member in accordance with the control signal to effect an energy supply to said recording surface responsive to said variations of said electrical quantity throughout said recording range.

2. In an inkless recorder for recording variations in an electrical quantity on a record sheet having an energy sensitive recording surface, a marking member disposed adjacent said recording surface and movable in response to variations of said electrical quantity, an inductive reactor having a magnetic core and a pair of windings, an electrical circuit for supplying energy to said recording surface through said marking member including in serial relationship a source of alternating current and one of said windings, and an electrical circuit for energizing the other of said windings in accordance with said variations in said electrical quantity, the interaction between said windings to cause said energy supplied to said recording surface to vary in response to said variations of said electrical quantity.

3. In an inkless recorder for recording variations in an electrical quantity on a record sheet having an energy sensitive recording surface, a marking member disposed adjacent said recording surface, a marking member disposed adjacent said recording surface and movable in response to variations of said electrical quantity, an inductive reactor having a magnetic core and a pair of windings, an electrical circuit for supplying energy to said recording surface through said marking member including in serial relationship a source of alternating current and one of said windings, and an electrical circuit for energizing the other of said windings including a rectifier connected to be energized in accordance with said variations of said electrical quantity and an amplifier connected to amplify the output of said rectifier and to supply the amplified output to said other winding, the interaction between said windings to cause said energy applied to said recording surface to vary in response to said variations of said electrical quantity.

4. In an inkless recorder for recording variations in an electrical quantity on a record sheet having a heat sensitive recording surface, a stylus disposed in contact with said recording surface and movable in response to variations of said electrical quantity, an inductor reactor having a magnetic core and a pair of windings, an electrical circuit for heating said stylus including in serial relationship a source of alternating current, one of said windings and a stylus heating loop, and an electrical circuit for energizing the other of said windings including a rectifier connected to be energized in accordance with said variations of said electrical quantity and an amplifier connected to amplify the output of said rectifier and to supply the amplified output to said other winding, the interaction between said windings to cause the current supplied to said heating loop to vary in response to said variations of said electrical quantity.

GEORGE F. GARDNER.

References Cited in the file of this patent
UNITED STATES PATENTS

| Number | Name | Date |
|---|---|---|
| 1,415,528 | Craighead | May 9, 1922 |
| 2,443,647 | Waterman | June 22, 1948 |
| 2,454,966 | Faus | Nov. 30, 1948 |
| 2,457,131 | Curtis | Dec. 28, 1948 |
| 2,543,779 | Hester et al. | Mar. 6, 1951 |